US012785325B2

(12) United States Patent
Halbig et al.

(10) Patent No.: US 12,785,325 B2
(45) **Date of Patent: *Nov. 3, 2026**

(54) CONNECTION SYSTEM FOR CONNECTING SIGNAL CONDUCTORS

(71) Applicant: MD ELEKTRONIK GmbH, Waldkraiburg (DE)

(72) Inventors: Thomas Halbig, Dietfurt (DE); Helmut Pritz, Ampfing (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 766 days.

This patent is subject to a terminal disclaimer.

(21) Appl. No.: 17/729,012

(22) Filed: Apr. 26, 2022

(65) Prior Publication Data

US 2022/0360017 A1 Nov. 10, 2022

(30) Foreign Application Priority Data

May 4, 2021 (DE) ..................... 10 2021 111 447.0

(51) Int. Cl.
*H01R 13/627* (2006.01)

(52) U.S. Cl.
CPC ..... *H01R 13/6272* (2013.01); *H01R 13/6275* (2013.01)

(58) Field of Classification Search
None
See application file for complete search history.

(56) References Cited

U.S. PATENT DOCUMENTS 3,851,946 A * 12/1974 Piaget ................ H01R 13/6278 439/825
4,148,538 A * 4/1979 Rodondi ............ H01R 13/6278 439/347
4,674,814 A * 6/1987 Hoshino ................ H01R 13/62 439/372
4,871,323 A * 10/1989 Ohsumi ............... H01R 13/639 439/509

(Continued)

FOREIGN PATENT DOCUMENTS

DE 102005002513 A1 3/2006
DE 102013110512 A1 3/2015

(Continued)

*Primary Examiner* — Felix O Figueroa

(74) *Attorney, Agent, or Firm* — LEYDIG, VOIT & MAYER, LTD.

(57) ABSTRACT

A connection system includes a connector, a mating connector and a locking unit disposed on the connector and having a locking member. The connector and the mating connector each have a housing with a contact carrier disposed therein. The contact carriers are each connected to a signal conductor. The connector is movable in a mating direction into a connected position with the mating connector, in which the signal conductors are conductively connected. The contact carriers each have a through-opening disposed transverse to the mating direction. In the connected position, the through-openings are in alignment with each other, and the locking member is movable between a locking position, in which the locking member is located in the through-openings, and an unlocking position, in which the locking member is located outside of a through-opening.

16 Claims, 7 Drawing Sheets

(56) References Cited

U.S. PATENT DOCUMENTS

| | | | | | |
|---|---|---|---|---|---|
| 5,034,727 | A * | 7/1991 | Muraoka | H01R 13/703<br>340/687 |
| 5,637,009 | A * | 6/1997 | Tsuji | H01R 13/639<br>439/489 |
| 6,155,862 | A * | 12/2000 | Chiu | H01R 13/6278<br>439/347 |
| 6,572,401 | B2 * | 6/2003 | Kurimoto | H01R 13/639<br>439/489 |
| 11,550,277 | B2 * | 1/2023 | Lovegrove | H04L 67/125 |
| 2023/0123938 | A1 * | 4/2023 | Halbig | G02B 6/3831<br>385/58 |

FOREIGN PATENT DOCUMENTS

| | | | |
|---|---|---|---|
| DE | 102017003296 | B3 | 5/2018 |
| EP | 0430107 | A2 | 6/1991 |

* cited by examiner

CONNECTION SYSTEM FOR CONNECTING SIGNAL CONDUCTORS

CROSS REFERENCE TO RELATED APPLICATION

This application claims benefit to German Patent Application No. DE 10 2021 111 447.0, filed on May 4, 2021, which is hereby incorporated by reference herein.

FIELD

The invention relates to a connection system for releasably connecting, in particular electrical and optical, signal conductors.

BACKGROUND

In order to create a releasable connection between optical or electrical conductors, connector assemblies are commonly used today. In this connection, one usually makes use of an operating principle where a latching hook disposed on one of the mating connector sections is connected to a latch tab disposed on the other mating connector section. Both the latching hook and the latch tab are generally disposed on the housings of the mating connector sections. Although the conductors are, in fact, also connected to each other during this mating process, the primary and mechanically strong connection is usually made via the housings of the connectors. However, connecting the mating connector sections via the housings has the disadvantage of resulting in additional positional tolerances and component tolerances, which can add up to very large tolerances. Especially when very high signal rates are to be transmitted via the optical or electrical conductors, the problem may arise that a sufficiently stable connection of the conductors can no longer be ensured due to tolerance variations.

SUMMARY

In an embodiment, the present disclosure provides a connection system includes a connector, a mating connector and a locking unit disposed on the connector and having a locking member. The connector and the mating connector each have a housing and a contact carrier disposed in the housing. The contact carriers are each connected to at least one signal conductor. The connector is movable in a mating direction into a connected position with the mating connector, in which the at least one signal conductor of the connector is conductively connected to the signal conductor of the mating connector. The contact carriers each have at least one through-opening disposed transverse to the mating direction. In the connected position, the through-openings of the contact carriers are in alignment with each other. Also, in the connected position, the locking member is movable between a locking position, in which the locking member is located in the through-openings of both contact carriers, and an unlocking position, in which the locking member is located outside of the through-opening of at least one of the contact carriers.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
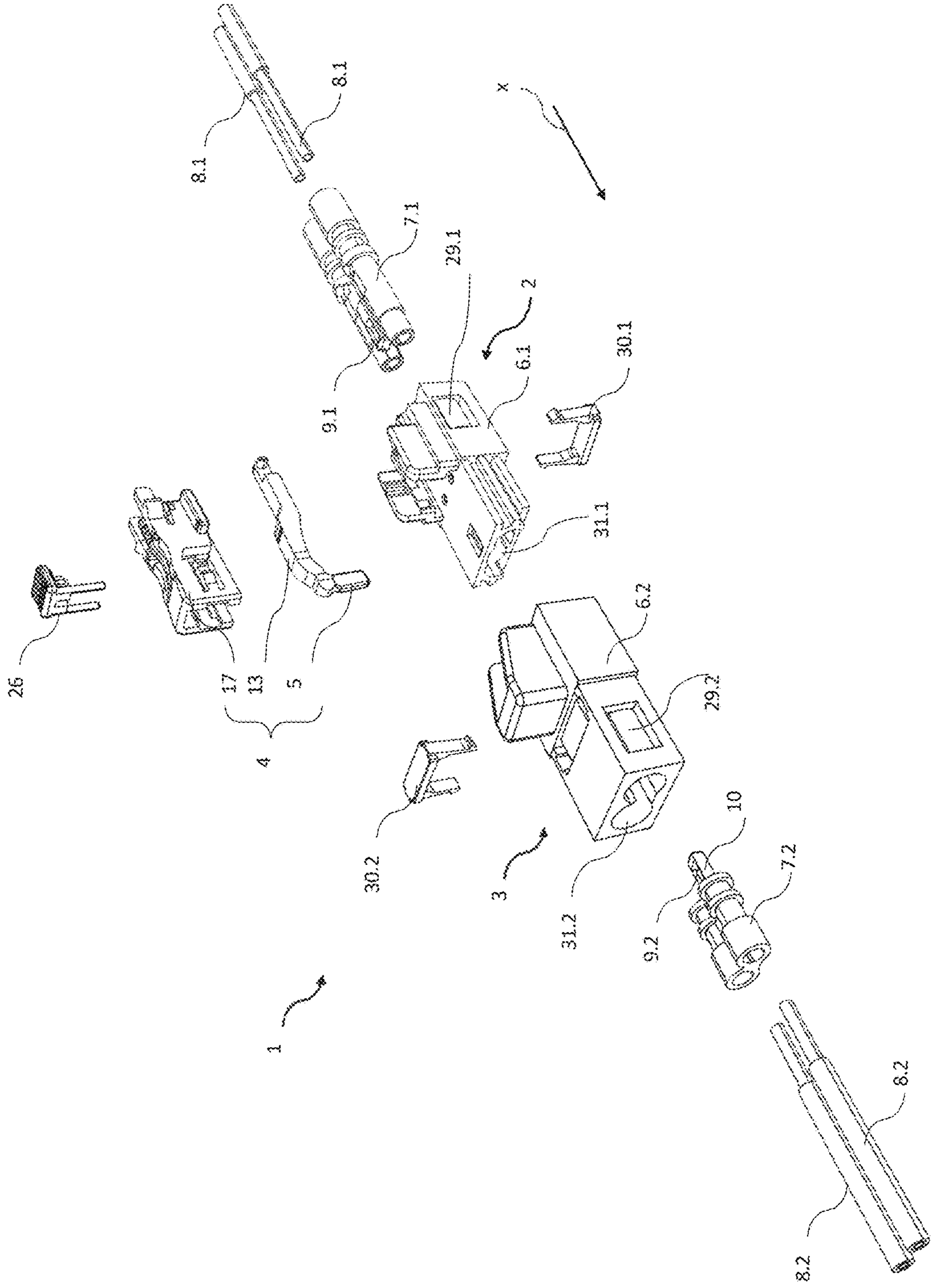
FIG. 1 is a perspective exploded view of a first embodiment of a connection system according to the invention.

In an embodiment, the present invention provides a connection system which overcomes at least one of the disadvantages of the above-mentioned prior art and which in particular is subject to less tolerance variations.

A connection system according to an embodiment of the invention includes a connector, a mating connector, and a locking unit. Furthermore, the locking unit has a locking member and is disposed on the connector. Both the connector and the mating connector each have a housing. Furthermore, both the connector and the mating connector each have a contact carrier, the contact carrier of the connector being disposed in the housing of the connector, and the contact carrier of the mating connector being disposed in the housing of the mating connector. The contact carriers may be secured in the respective housings with the aid of snap-fit connections, for example. An additional, secondary locking means may also be provided which additionally secures the contact carriers in the respective housings. The contact carrier of the connector and the contact carrier of the mating connector are each connected to at least one signal conductor. The contact carriers can thus be used to mount the signal conductors within the housings of the connector and the mating connector. The signal conductor may be both an optical conductor for transmitting light signals and an electrical conductor for transmitting electrical signals. The signal conductor may be both part of a single- or multi-conductor cable and directly connected to and in signal communication with a circuit board. If the signal conductor is an electrical conductor, it may, for example, be soldered to the circuit board. However, if the signal conductor is an optical conductor, it may be connected to the circuit board via a transmission element that converts light signals into electrical signals. Furthermore, it is preferred that both contact carriers have the same number of connected signal conductors, it being possible to associate each signal conductor disposed on the contact carrier of the connector with a signal conductor of the contact carrier of the mating connector.

The connector is movable in a mating direction into a connected position with the mating connector, in which the connector is connected to the mating connector. In the connected position, the connector is connected to the mating connector in such a way that the signal conductor of the connector is conductively connected to the signal conductor of the mating connector. A conductive connection between the signal conductors can be understood to mean in this context that signals propagating in the signal conductors can be transmitted to the respective other signal conductor. In the region of the contact carrier, the signal conductors may have additional contact elements which facilitate the transmission of signals between the signal conductors. The contact carrier of the connector and the contact carrier of the mating connector each have a through-opening disposed transverse to the mating direction. In other words, the through-openings extend through the contact carriers transversely to the mating direction. When the connector and the mating connector are in the connected position, the through-openings of the contact carriers are in alignment with each other. In this context, "in alignment" can be understood to mean that the through-openings of the contact carriers together form a passage. In another embodiment, the housing of the connector may also have a through-opening, in which case the through-openings of the contact carriers and the through-opening of the housing of the connector are in alignment when in the connected position. In the connected position, the locking member of the locking unit is movable between a locking position and an unlocking position. In the locking position, the locking member is located in the through-openings of both contact carriers. Thus, in the locking position, the contact carriers are interlockingly connected together with the aid of the locking unit. In the unlocking position, the locking member is located outside of the through-opening of at least one contact carrier. Depending on the particular embodiment, the locking member may also be located outside of both through-openings. Preferably, movement of the locking member between the release position and the locking position in the region of the through-holes is perpendicular to the mating direction.

The connection system according to an embodiment of the invention creates a releasable interlocking connection between the connector and the mating connector at the contact carriers with the aid of the locking unit. Thus, the chain of tolerances that directly influences the connection between the signal conductor of the connector and that of the mating connector can be shortened, in particular in a direction parallel to the mating direction. Therefore, tolerances arising, for example, between the housings of the connector and the mating connector do not affect the connection between the signal conductors. At the same time, the connection system remains very versatile in terms of use since additional features, such as keying means on the housings, can still be used.

At least one of the contact carriers may have a tongue extending parallel to the mating direction and having the through-opening formed therein. The through-opening is preferably disposed at an end of the tongue facing away from the contact carrier that is provided with the tongue. The tongue makes it easier for the through-openings of the two contact carriers to be aligned with each other in the connected position. Furthermore, it may be particularly advantageous if the two contact carriers each have a tongue having a respective through-opening formed therein. In this case, the tongues may be shaped such that they at least partially slide past each other as they are moved into the connected position, so that the through-openings of the two contact carriers can be brought into alignment with each other. Particularly preferably, the tongues have complementary geometries.

The contact carrier of the connector and the contact carrier of the mating connector may be each connected to two signal conductors. In this case, it is preferred that each of the through-openings be disposed between the signal conductors in the contact carrier. In this way, a particularly stable interlocking connection between the connector and the mating connector can be achieved since the connection is significantly less susceptible to stresses transverse to the mating direction.

The locking member may be biased toward the locking position with the aid of a spring element. The spring element may be disposed directly on the locking member or alternatively on a component of the locking unit that is connected to the locking member. Preferably, the locking member can be moved from the locking position to the unlocking position only by externally applied force when the locking member is biased by the spring element toward locking position. The contact carrier of the mating connector may have an entry bevel. The entry bevel is preferably disposed such that the biased locking member is deflected out of the locking position when the connector and the mating connector are moved into the connected position. The entry bevel may be disposed in front of the through-opening of the contact carrier of the mating connector when viewed in the mating direction. Once the deflected locking member reaches the through-opening of the contact carrier of the mating connector, the locking member can preferably move by itself through the through-opening into the locking position due to its bias.

The spring element is preferably disposed on the contact carrier of the connector. The housing may have an aperture in which the spring element is disposed. Furthermore, the spring element is preferably formed in one piece with the contact carrier. Furthermore, because the contact carrier includes the spring element, the number of components required can be kept low, whereby both the effort required to assemble the connector and the costs may be additionally reduced. Furthermore, the locking unit may be disposed at a small distance from the housing, which reduces the space requirements.

The locking unit may have a lever arm on which the locking member is disposed. The lever arm may be disposed about a rotation axle extending transverse to the mating direction. The lever arm may be formed in one piece with the housing of the connector or as a separate component. A longitudinal axis of the lever arm may be parallel to the mating direction, at least in the locking position. The rotation axle allows the lever arm to be moved in a first and a second direction of rotation. In the first direction of rotation, the locking member is movable from the unlocking position to the locking position. In the second direction of rotation, the locking member is movable from the locking position to the unlocking position. The lever arm may be connected by a pivot to the housing of the connector. Particularly preferably, the pivot is disposed on a side of the housing of the connector facing away from the contact carrier of the connector.

The lever arm may have a first latching element which, in the connected position, is connectable to a first complementary latching element on the mating connector, in particular on the housing of the mating connector. In this context, it is particularly preferred that the first latching element be connectable to the first complementary latching element when the locking member is in the locking position. The first latching element may be configured, for example, as a latching tooth and the first complementary latching element as a latch tab. The first latching element is preferably disposed on the lever arm in such a way that when the connector is moved relative to the mating connector into the connected position, the lever arm is deflected in the second direction of rotation by the contact with the first complementary latching element before the first latching element is connected to the first complementary latching element. Furthermore, the connection between the first latching element and the first complementary latching element allows an additional interlocking connection to be created between the connector and the mating connector.

The locking unit may have an actuation member which is, in particular linearly, displaceable parallel to the mating direction and has a first abutment element. Preferably, the actuation member is disposed on the housing of the connector on a side facing away from the contact carrier of the connector. The lever arm may be movable by the first abutment element in the first direction of rotation when the actuation member is displaced in the mating direction. For example, the first abutment element may exert a force on the lever arm in the mating direction as a result of the movement of the actuation member in the mating direction. In this way, the linear movement of the actuation member is coupled with the rotational movement of the lever arm and allows for easy operation of the locking unit.

The actuation member may have a second abutment element. The second abutment element is preferably disposed such that the lever arm is movable by the second abutment element in the second direction of rotation when the actuation member is displaced in a direction opposite to the mating direction. For this purpose, the lever arm is preferably disposed between the first abutment element and the second abutment element. In this way, the movement of the lever arm in the first and second directions of rotation is coupled with the, in particular linear, movement of the actuation member in and opposite to the mating direction. Thus, the locking member can be moved between the locking position and the unlocking position by the lever with the aid of the actuation member.

The actuation member may have at least one second latching element which is connectable to a second complementary latching element on the connector. Due to the connection between the second latching element and the second complementary latching element, the actuation member can be locked in a first operative position. Preferably, the locking member is in the unlocking position when the actuation member is in the first operative position. Furthermore, it is preferred that in the first operative position, the actuation member prevent the locking member from moving into the locking position. The mating connector may have at least one actuating element that deflects the second latching element in the connected position and prevents connection to the second complementary latching element. In addition, the actuating element may cause the connection between the second latching element and the second complementary latching element to be released when the connector and mating connector are moved into a connected position while the second latching element and the second complementary latching element are in a connected state. The actuating element may be, for example, an abutment surface or a projection. The second latching element and the second complementary latching element allow the actuation member to be held in the first operative position when the connector and the mating connector are out of the connected position. Because the actuating element prevents connection between the second latching element and the second complementary latching element or releases an existing connection as soon as the connector and mating connector are moved into the connected position, it can additionally be ensured that the actuation member can be moved out of the first operative position only in the connected position.

The actuation member may have at least one third latching element which is connectable to a third complementary latching element by moving the actuation member in the mating direction. The third complementary latching element may be disposed both on the connector and on the mating connector. A connection between the third latching element and the third complementary latching element may lock the actuation member in a second operative position. Preferably, the locking member is in the locking position when the actuation member is in the second operative position. Furthermore, it is preferred that in the second operative position, the actuation member prevent the locking member from moving into the unlocking position. By locking the actuation member in the second operative position, it can be ensured that the actuation member cannot move out of this second operative position by itself.

The locking unit may have a mounting element which, in particular releasably, secures the contact carrier of the connector in the housing of the connector. For example, the locking unit may have a stud that protrudes into an insertion space of the housing of the connector and by which the contact carrier disposed in the insertion space is at least additionally secured in the insertion space. In this case, the stud is preferably disposed perpendicular to the mating direction.

The connector may have a position retainer which, at least in a final latched position, blocks the locking member in the locking position. Preferably, the position retainer is movable between a pre-latched position and the final latched position when the locking member is in the locking position. In the final latched position, the position retainer can block the locking member in the locking position and in particular prevents the locking member from moving into the unlocking position. In the pre-latched position, the position retainer may be located on the connector without blocking the locking member in the pre-latched position. However, the position retainer does not need to be mechanically coupled directly to the locking member for this purpose. It is also possible that the position retainer may be movable between the pre-latched position and the final latched position when the actuation member is in the second operative position. In the final latched position, the position retainer may, for example, prevent the lever arm from rotating in the second direction of rotation. Alternatively or additionally, the position retainer may also block the locking member by blocking the actuation member in the second operative position.

The locking unit may have at least one pin which, in the final latched position, is located within a recess provided in the position retainer. In the pre-latched position, the pin is preferably located outside of the recess. Preferably, the pin extends perpendicular to the mating direction and may be disposed on the locking member or on the lever arm. By locating the pin in the recess, the locking member may additionally be mechanically stabilized in the final latched position. The risk of the locking member being moved out of the locking position by external forces acting on the connection system can be thus eliminated.

FIG. 1 shows a first embodiment of a connection system 1 according to the invention in a perspective exploded view. Connection system 1 is composed of a connector 2, a mating connector 3, and a locking unit 4. Connector 2 includes a housing 6.1 having an insertion space 31.1 formed therein. A contact carrier 7.1 can be inserted into insertion space 31.1. Contact carrier 7.1 is releasably securable within insertion space 31.1 with the aid of a primary securing means 29.1 and a secondary securing means 30.1. Two signal conductors 8.1 are connected to contact carrier 7.1. In the present embodiment, signal conductors 8.1 are optical conductors. Contact carrier 7.1 has a through-opening 9.1 between signal conductors 8.1. Mating connector 3 also has a housing 6.2 with an insertion space 31.2 in which a contact carrier 7.2 is releasably securable with the aid of a primary securing means 29.2 and a secondary securing means 30.2. Contact carrier 7.2 of mating connector 3 is also connected to two signal conductors 8.2 in the form of optical conductors. Contact carrier 7.2 of mating connector 3 has a tongue 10 extending away from contact carrier 7.2 and parallel to a mating direction x. Tongue 10 also has a through-opening 9.2. Locking unit 4 is disposed on housing 6.1 of connector 2 and is composed of a locking member 5 connected to a lever arm 13, and an actuation member 17. Connection system 1 further includes a position retainer 26, which in the present embodiment is disposed on connector 2.

Figure 2:
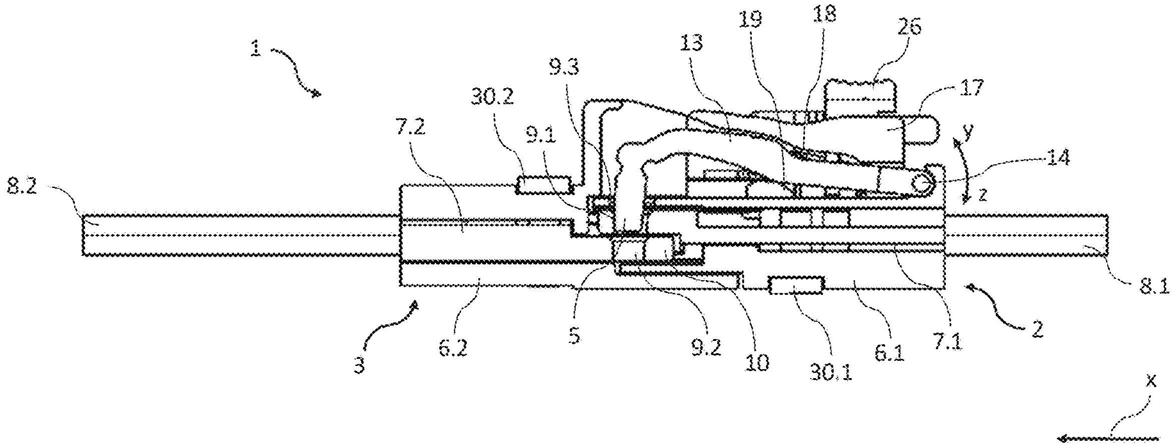
FIG. 2 is a sectional view of the inventive connection system according to the first embodiment.

FIG. 2 shows a sectional view of the connection system 1 according to the first embodiment. The sectional plane extends parallel to mating direction x between signal conductors 8.1; 8.2. Connector 2 and mating connector 3 are in a connected position. In the connected position, signal conductors 8.1; 8.2 are also conductively interconnected, so that in the present embodiment, light signals can be transmitted between the signal conductors 8.1 of connector 2 and the signal conductors 8.2 of mating connector 3. Lever arm 13 is connected by a rotation axle 14 to housing 6.1 of connector 2. In the present embodiment, rotation axle 14 takes the form of a pivot. Lever arm 13 is movable in a first direction of rotation y and a second direction of rotation z. In the connected position, the through-openings 9.1; 9.2 of contact carrier 7.1; 7.2 and a through-opening 9.3 in housing 6.1 of connector 2 are in alignment with each other. The locking member 5 connected to the lever arm is located within a through-opening 9.3 disposed in housing 6.1 and a through-opening 9.1 in contact carrier 7.1 of connector 2. However, locking member 5 is located outside of through-opening 9.2 of mating connector 3 and is in an unlocking position. Actuation member 17 is disposed on housing 6.1 of connector 2 in such a way that it is movable parallel thereto between a first and a second operative position. In the illustrated view, actuation member 17 is in the first operative position. Actuation member 17 has a first abutment element 18 and a second abutment element 19. Lever arm 13 extends between first and second abutment elements 18; 19. Position retainer 26 is disposed on actuation member 17 in a pre-latched position.

Figure 3:
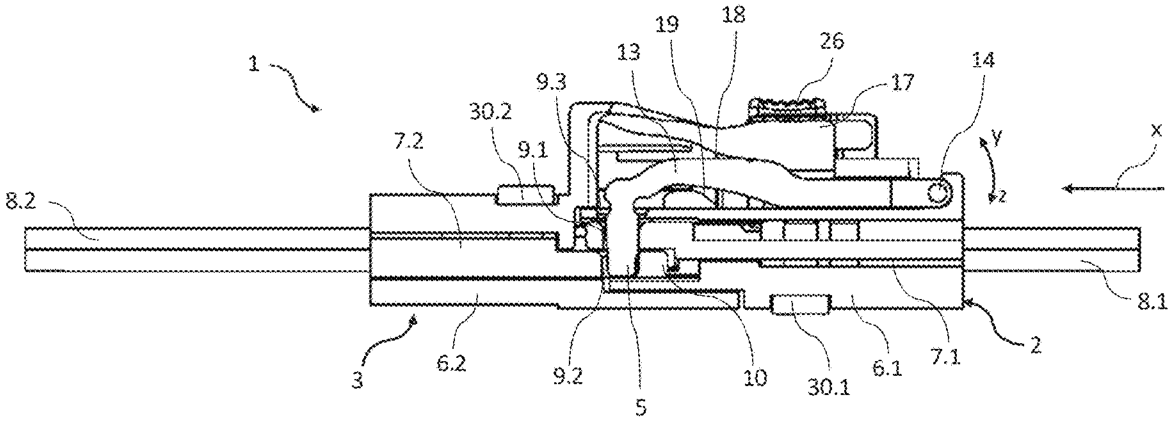
FIG. 3 is another sectional view of the inventive connection system according to the first embodiment.

FIG. 3 shows another sectional view of the connection system 1 according to the first embodiment. In contrast to FIG. 2, actuation member 17 was moved in mating direction x from the first operative position into a second operative position. In the process, first and second abutment elements 18; 19 were also moved in mating direction x. In the process, lever arm 13 was moved by first abutment element 18 in the first direction of rotation y. The movement of lever arm 13 in the first direction of rotation y caused locking member 5 to be moved from the unlocking position to a locking position. In the locking position, which is shown in FIG. 3, locking member 5 is located in the through-openings 9.1; 9.2 of the two contact carriers and in through-opening 9.3 of housing 6.1. Through-openings 9.1; 9.2; 9.3 extend transversely to the mating direction, so that the locking member 5, in the locking position, creates an interlocking connection between the contact carrier 7.1 of connector 2 and the contact carrier 7.2 of the mating connector. Position retainer 26 is located in a final latched position and blocks actuation member 17 from moving back into the first operative position. Since in the second operative position, first abutment element 18 bears against lever arm 13, the locking member is also blocked in the locking position. In order to move locking member 5 back into the unlocking position, actuation member 17 can be moved into the first operative position in a direction opposite to mating direction x, provided the position retainer 26 is in the pre-latched position. As a result of the movement of actuation member 17 in a direction opposite to the mating direction, second abutment element 19 deflects lever arm 13 in the second direction of rotation z and thus moves the locking member from the locking position back into the unlocking position.

Figure 4:
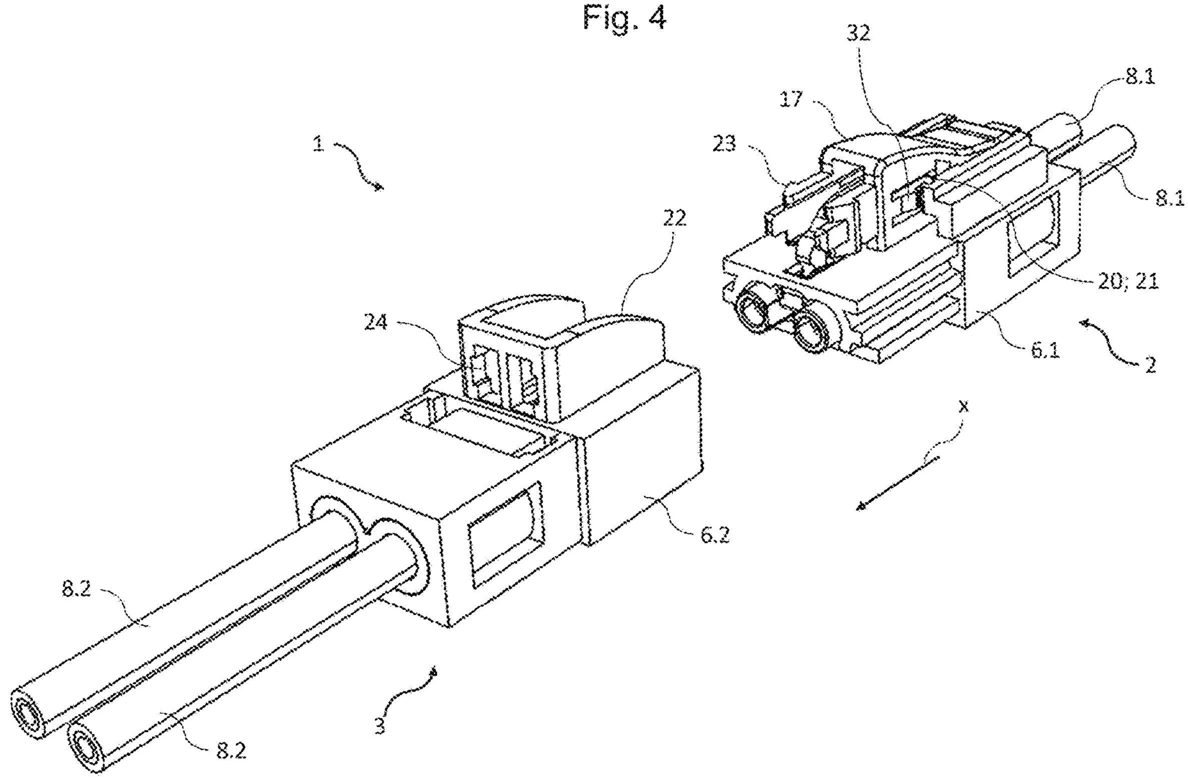
FIG. 4 is a perspective view of a second embodiment of the inventive connection system.

FIG. 4 shows a second embodiment of the inventive connection system 1 in a perspective view where connector 2 and mating connector 3 are out of the connected position. Actuation member 17 is in the first operative position. Actuation member 17 has a second latching element 20 which is connected to a second complementary latching element 21. In the present embodiment, second latching element 20 is configured as a latching hook, and second complementary latching element 21 is configured as a latch receptacle. Due to the connection between second latching element 20 and second complementary latching element 21, actuation member 17 is locked in the first operative position. In order to enable actuation member 17 to move into the second operative position when connector 2 and mating connector 3 are in a connected position, mating connector 3 has an actuating element 22, which in the present embodiment takes the form of an abutment surface. When connector 2 and mating connector 3 are moved into the connected position, actuating element 22 strikes against a deflecting element 32. In the present embodiment, this striking contact releases second latching element 20 from connection with the second complementary latching element 21.

Figure 5:
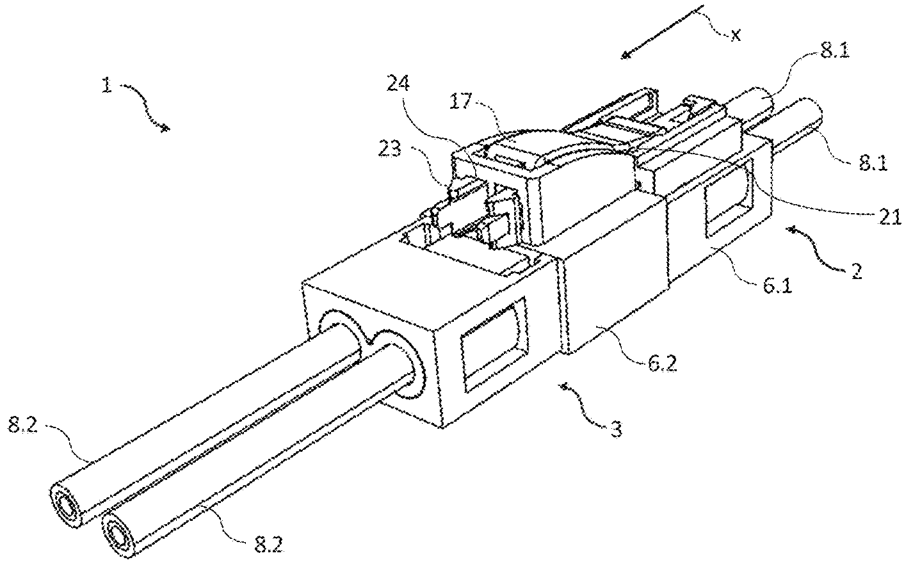
FIG. 5 is another perspective view showing the inventive connection system according to the second embodiment in a connected position.

FIG. 5 shows, in perspective view, the second embodiment of the inventive connection system 1 in the connected position. Furthermore, actuation member 17 is in the second operative position. Actuation member 17 has a third latching element 23 which is connected to a third complementary latching element 24 when in the second operative position. In the present embodiment, third latching element 23 is in the form of two latching hooks that engage in the third complementary latching element 24, which is in the form of two latch receptacles. The connection via third latching element 23 to third complementary latching element 24 allows actuation member 17 to be locked in the second operative position. In addition, a further interlocking connection can be created that holds connector 2 and mating connector 3 in the connected position.

Figure 6:
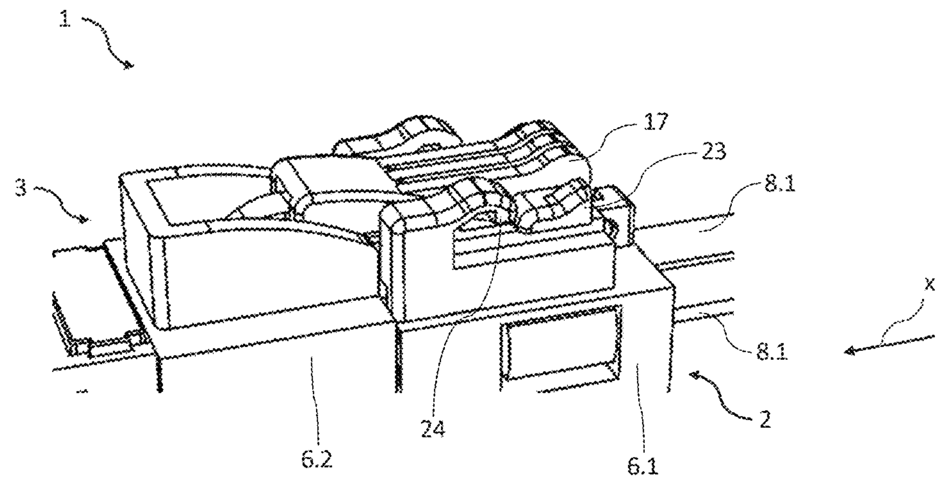
FIG. 6 is a perspective view of a third embodiment of the inventive connection system.

FIG. 6 shows a third embodiment of the inventive connection system 1 in a perspective view. Connector 2 and mating connector 3 are in the connected position, and actuation member 17 is in the first operative position. Actuation member 17 has two third latching elements 23 which are connectable to a third complementary latching element 24. However, in the fourth embodiment, complementary latching element 24 is disposed on connector 2.

Figure 7:
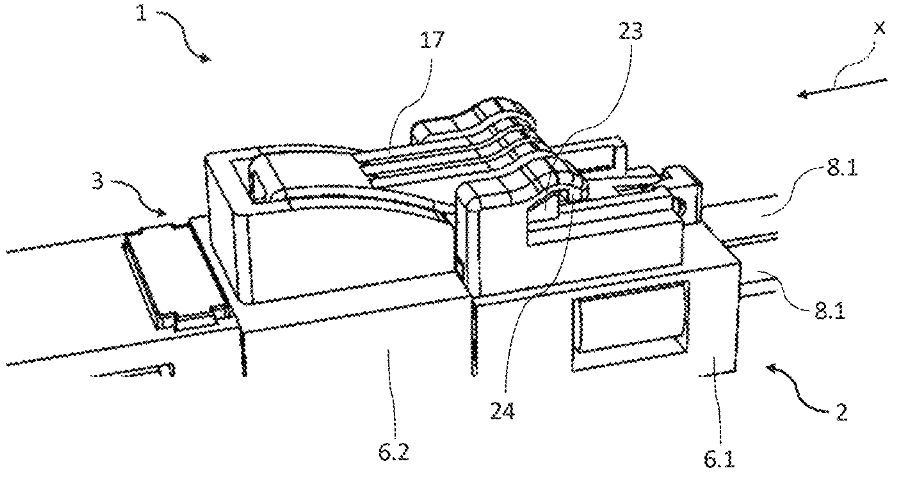
FIG. 7 is another perspective view of the inventive connection system according to the third embodiment.

FIG. 7 shows the third embodiment of the inventive connection system 1 in a perspective view where actuation member 17 is in the second operative position. Third latching element 23 is connected to the third complementary latching element 24 on connector 2, so that actuation member 17 is locked in the second operative position.

Figure 8:
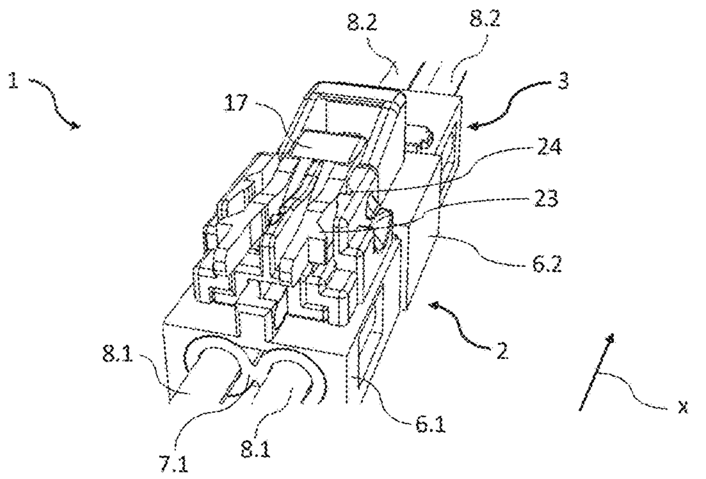
FIG. 8 is a perspective view of a fourth embodiment of the inventive connection system.

FIG. 8 shows a fourth embodiment of the inventive connection system 1 in a perspective view where connector 2 and mating connector 3 are in the connected position. Actuation member 17 is in the first operative position. Furthermore, actuation member 17 has two opposite third latching elements 23, which project outwardly from the sides of actuation member 17. The two third latching elements are disposed on flexible arms of actuation member 17. Connector 2 has two opposite third complementary latching elements 24 which are connectable to third latching elements 23. When actuation member 17 is moved in mating direction x into the second operative position, the flexible arms move inwardly until third latching elements 23 engage in third complementary latching elements 24. Due to the elastic deformation, the flexible arms move back outwardly by themselves and thus hold third latching elements 23 in interlocking connection with complementary latching elements 24.

Figure 9:
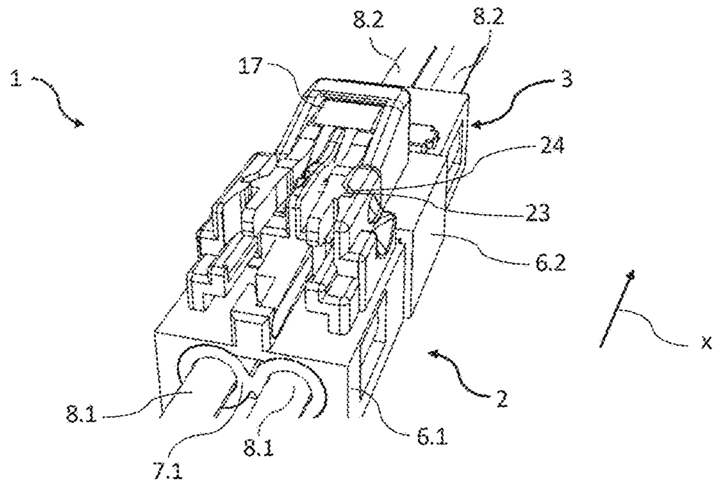
FIG. 9 is another perspective view of the inventive connection system according to the fourth embodiment.

FIG. 9 shows the fourth embodiment of the inventive connection system 1 in a perspective view. Connector 2 and mating connector 3 are in the connected position, and actuation member 17 is in the second operative position. Third latching elements 23 are connected to complementary latching elements 24 and lock actuation member 17 in the second operative position.

Figure 10:
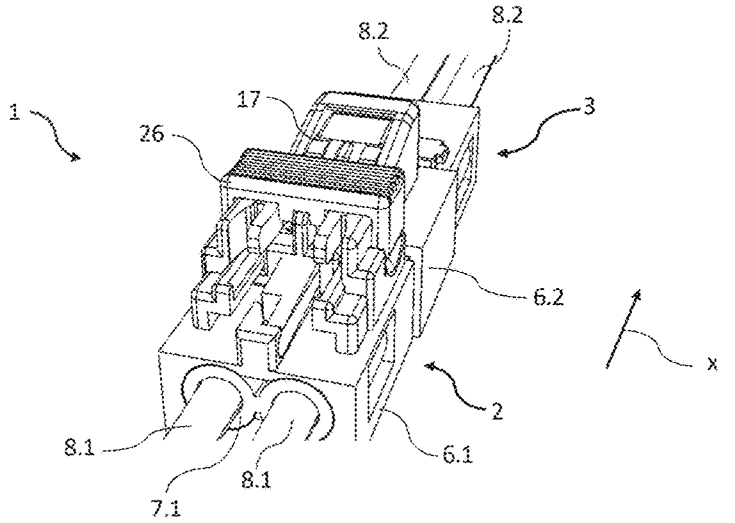
FIG. 10 is a further perspective view of the inventive connection system according to the fourth embodiment.

FIG. 10 shows the fourth embodiment of the inventive connection system 1 in the connected position in a perspective view where actuation member 17 is in the second operative position. In addition, a position retainer 26 is attached to connector 2. Position retainer 26 is in the final latched position and is partially located between the flexible arms of actuation member 17. Because position retainer 26 is disposed between the flexible arms, the arms can no longer move inwardly, and thus the third latching elements 23 cannot be released from the connection with complementary latching elements 24. In this way, position retainer 26 additionally blocks actuation member 17 in the second operative position.

Figure 11:
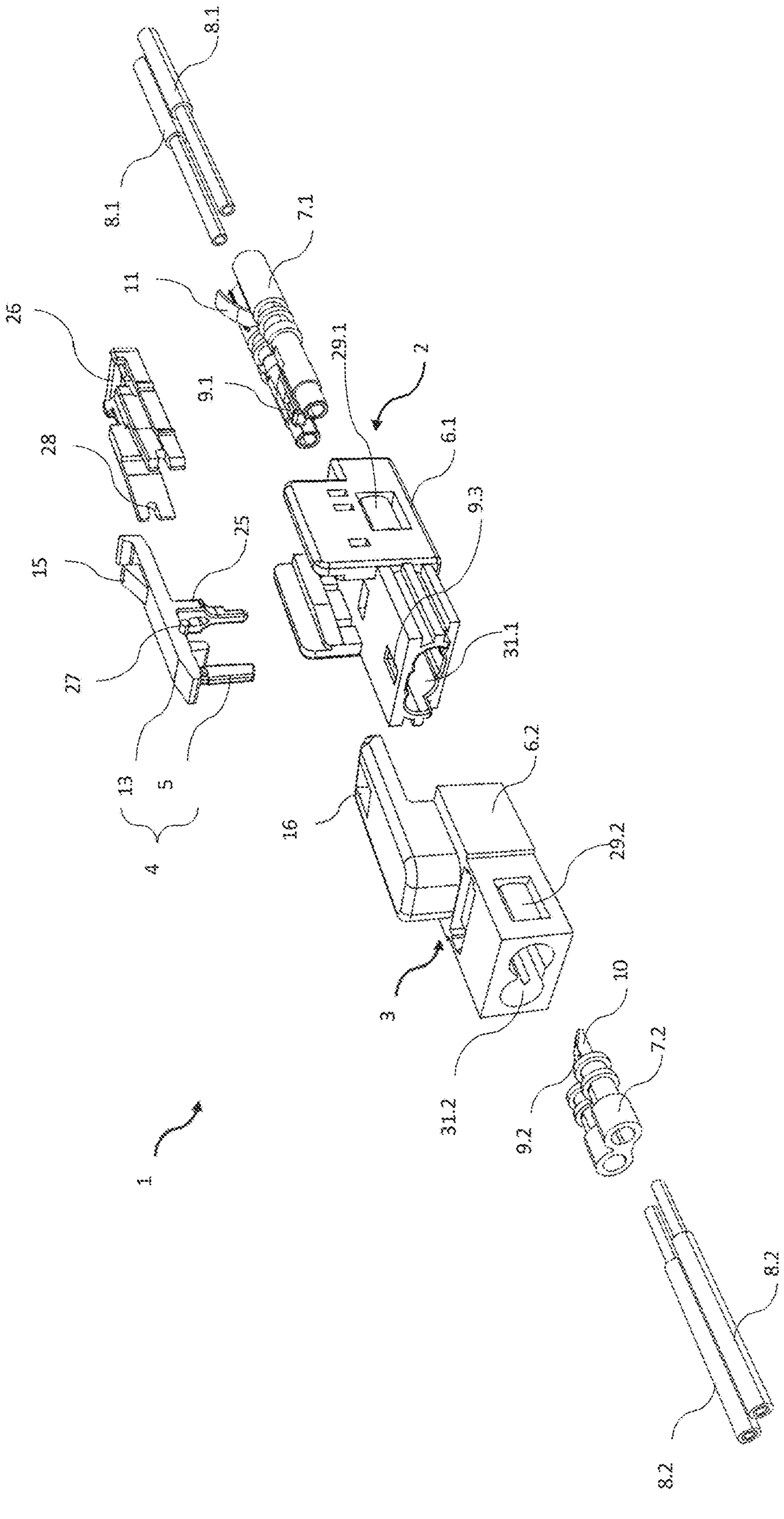
FIG. 11 is a perspective exploded view of a fifth embodiment of the inventive connection system.

FIG. 11 shows a fifth embodiment of the inventive connection system 1 in a perspective exploded view. In contrast to the first embodiment, locking unit 4 includes lever arm 13 and locking member 5. In the fifth embodiment, no additional actuation member is needed. The lever arm is connected to housing 6.1 of connector 2 with the aid of a mounting element 25. Position retainer 26 is disposed between housing 6.1 and lever arm 13 and is movable between a pre-latched position and a final latched position. Furthermore, position retainer 26 has two recesses 28 into which two pins 27 disposed on the lever arm are insertable in the final latched position. In addition, lever arm 13 has a first latching element 15 which is connectable to a complementary latching element 16 on housing 6.2 of mating connector 3.

Figure 12:
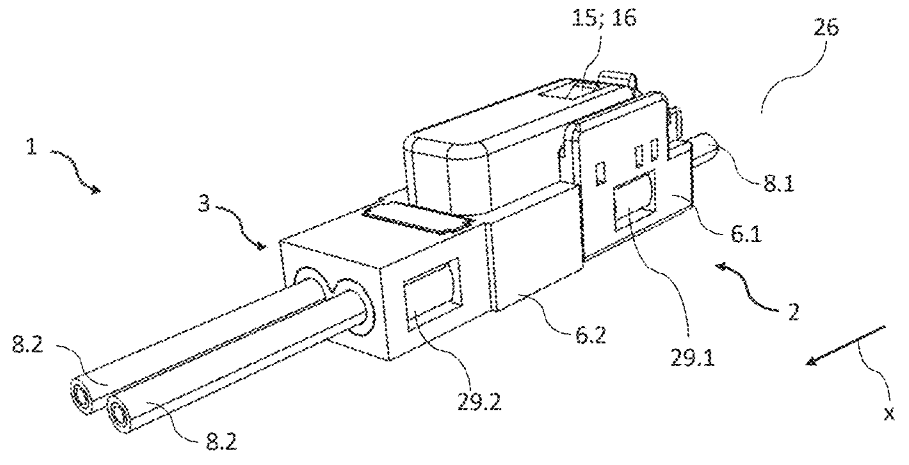
FIG. 12 is a perspective view showing the inventive connection system according to the fifth embodiment in a connected position.

FIG. 12 shows the fifth embodiment of the inventive connection system 1 in a perspective view where connector 2 and mating connector 3 are in a connected position. First latching element 15 is connected to first complementary latching element 16. In the present embodiment, first latching element 15 is configured as a latching hook, and complementary latching element 16 configured as a latch tab, so that an interlocking connection is created between connector 2 and mating connector 3.

Figure 13:
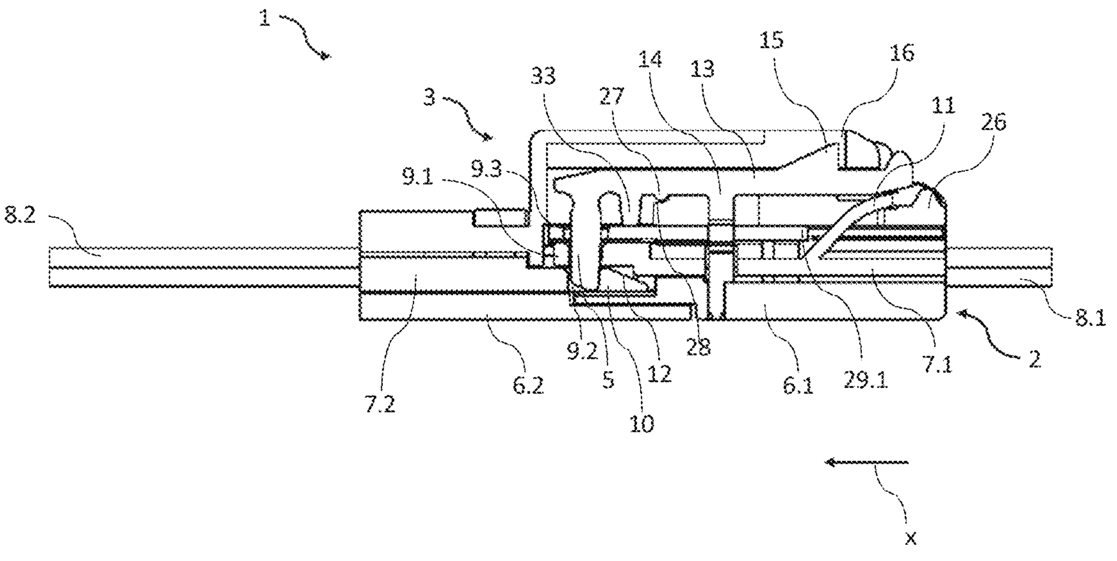
FIG. 13 is a sectional view of the inventive connection system according to the fifth embodiment.

FIG. 13 shows a sectional view of the fifth embodiment of the inventive connection system 1 in the connected position, the sectional plane extending parallel to mating direction x between signal conductors 8.1; 8.2. Latching element 15 is disposed on lever arm 13 in such a way that when connector 2 is moved into the connected position, latching element 15 first strikes against the complementary latching element. Due to the ramp located on latching element 15, lever arm 13 is deflected in the second direction of rotation, thereby moving locking member 5 into the unlocking position. Once connector 2 reaches the connected position, latching element 15 snaps into complementary latching element 16, and the lever arm moves in the first direction of rotation due to its bias. Consequently, locking member 5 moves back into the locking position. Mounting element 25 extends through the insertion space of connector 2, so that mounting element 25 not only secures lever arm 13 and locking member 5 to connector 2, but also serves to additionally secure contact carrier 7.1 in the insertion space of connector 2. Contact carrier 7.1 further has a spring element 11 that biases lever arm 13 in the first direction of rotation y, and thus biases locking member 5 into the locking position. To prevent lever arm 13 from being excessively biased in the region of the locking member, lever arm 13 has a supporting element 33 which is disposed on a side facing the housing 6.1 of connector 2 and which, in the locking position, bears against housing 6.1. In the present embodiment, rotation axle 14 of lever arm 13 is disposed in the region of mounting element 25. Spring element 11 at the same time clamps first latching element 15 against first complementary latching element 16 and additionally ensures a reliable connection between first latching element 15 and first complementary latching element 16. By biasing locking member 5 into the locking position, it is not only possible to create a stable interlocking connection when locking member 5 is located within through-openings 9.1; 9.2; 9.3. Rather, it can thus be ensured that locking member 5 snaps into through-opening 9.2 of contact carrier 7.2 of mating connector 3 by itself when the connector 2 and the mating connector are brought into the connected position. Since, in order to insert locking member 5 into through-opening 9.2 of contact carrier 7.2 of mating connector 3, locking member 5 must be deflected out of the locking position, contact carrier 7.2 of mating connector 3 has an entry bevel 12 in front of through-opening 9.2 in mating direction x. Position retainer 26 is in the final latched position and is disposed between spring element 11 and the housing 6.1 of the connector, thereby preventing lowering of lever arm 13 in the region of first latching element 15. In addition, pins 27 on lever arm 13 are embraced by the recesses 28 of the position retainer, thereby additionally preventing raising of lever arm 13 in the region of locking member 5.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of “A, B and/or C” or “at least one of A, B or C” should be interpreted as including any singular entity from the listed elements, e.g., A, any subset from the listed elements, e.g., A and B, or the entire list of elements A, B and C.

LIST OF REFERENCE NUMERALS

1 connection system
2 connector
3 mating connector
4 locking unit
5 locking member
6 housing
7 contact carrier
8 signal conductor
9 through-opening
10 tongue
11 spring element
12 entry bevel
13 lever arm
14 pivot
15 first latching element
16 first complementary latching element
17 actuation member
18 first abutment element
19 second abutment element
20 second latching element
21 second complementary latching element
22 actuating element
23 third latching element
24 third complementary latching element
25 mounting element
26 position retainer
27 pin
28 recess
29 primary securing means
30 secondary securing means
31 insertion space
32 deflecting element
33 supporting element

What is claimed is:

1. A connection system comprising:
a connector;
a mating connector; and
a locking unit disposed on the connector and having a locking member,
wherein:
the connector and the mating connector each have a housing and a contact carrier disposed in the housing,
the contact carriers are each connected to at least one signal conductor,
the connector is movable in a mating direction into a connected position with the mating connector, in which the at least one signal conductor of the connector is conductively connected to the signal conductor of the mating connector,
the contact carriers each have at least one through-opening disposed transverse to the mating direction,
in the connected position, the through-openings of the contact carriers are in alignment with each other, and
in the connected position, the locking member is movable between a locking position, in which the locking member is located in the through-openings of both contact carriers, and an unlocking position, in which the locking member is located outside of the through-opening of at least one of the contact carriers,
wherein the contact carriers are each connected to two signal conductors, and the through-openings of the contact carriers are each disposed between the signal conductors.

2. A connection system comprising:
a connector;
a mating connector; and
a locking unit disposed on the connector and having a locking member,
wherein:
the connector and the mating connector each have a housing and a contact carrier disposed in the housing,
the contact carriers are each connected to at least one signal conductor,
the connector is movable in a mating direction into a connected position with the mating connector, in which the at least one signal conductor of the connector is conductively connected to the signal conductor of the mating connector,
the contact carriers each have at least one through-opening disposed transverse to the mating direction,
in the connected position, the through-openings of the contact carriers are in alignment with each other, and
in the connected position, the locking member is movable between a locking position, in which the locking member is located in the through-openings of both contact carriers, and an unlocking position, in which the locking member is located outside of the through-opening of at least one of the contact carriers,
wherein the locking member is biased toward the locking position by a spring element.

3. A connection system comprising:
a connector;
a mating connector; and
a locking unit disposed on the connector and having a locking member,
wherein:
the connector and the mating connector each have a housing and a contact carrier disposed in the housing,
the contact carriers are each connected to at least one signal conductor,
the connector is movable in a mating direction into a connected position with the mating connector, in which the at least one signal conductor of the connector is conductively connected to the signal conductor of the mating connector,
the contact carriers each have at least one through-opening disposed transverse to the mating direction,
in the connected position, the through-openings of the contact carriers are in alignment with each other, and in the connected position, the locking member is movable between a locking position, in which the locking member is located in the through-openings of both contact carriers, and an unlocking position, in which the locking member is located outside of the through-opening of at least one of the contact carriers, wherein at least one of the contact carriers has a tongue extending parallel to the mating direction and having the through-opening of the respective contact carrier formed therein.

4. The connection system as recited in claim 3, wherein the contact carriers are each connected to two signal conductors, and the through-openings of the contact carriers are each disposed between the signal conductors.

5. The connection system as recited in claim 3, wherein the locking member is biased toward the locking position by a spring element.

6. The connection system as recited in claim 5, wherein the spring element is disposed on the contact carrier of the connector.

7. The connection system as recited in claim 5, wherein the spring element is disposed on the contact carrier of the connector.

8. The connection system as recited in claim 3, wherein the locking member is disposed on a lever arm, which is disposed about a rotation axle extending transversely to the mating direction and is movable in a first direction of rotation and a second direction of rotation opposite to the first direction of rotation, wherein, in the first direction of rotation, the locking member is movable from the unlocking position to the locking position, and, in the second direction of rotation, the locking member is movable from the locking position to the unlocking position.

9. The connection system as recited in claim 8, wherein the lever arm has a first latching element which, in the connected position, is connectable to a first complementary latching element on the mating connector.

10. The connection system as recited in claim 8, wherein the locking unit has an actuation member which is displaceable parallel to the mating direction and has a first abutment element, the lever arm being movable by the first abutment element in the first direction of rotation when the actuation member is displaced in the mating direction.

11. The connection system as recited in claim 10, wherein the actuation member has a second abutment element, the lever arm being movable by the second abutment element in the second direction of rotation when the actuation member is displaced in a direction opposite to the mating direction.

12. The connection system as recited in claim 10, wherein the actuation member has at least one second latching element which is connectable to a second complementary latching element on the connector and which locks the actuation member in a first operative position, and wherein the mating connector has at least one actuating element that deflects the second latching element in the connected position and prevents connection to the second complementary latching element.

13. The connection system as recited in claim 10, wherein the actuation member has at least one third latching element, which is connectable to a third complementary latching element on the connector or on the mating connector by moving the actuation member in the mating direction, and which locks the actuation member in a second operative position.

14. The connection system as recited in claim 3, wherein the locking unit has a mounting element which releasably secures the contact carrier of the connector in the housing of the connector.

15. The connection system as recited in claim 3, wherein the connector has a position retainer which, at least in a final latched position, blocks the locking member in the locking position.

16. The connection system as recited in claim 15, wherein the locking unit has at least one pin which, in the final latched position, is located within a recess provided in the position retainer.

* * * * *